Patented Feb. 14, 1928.

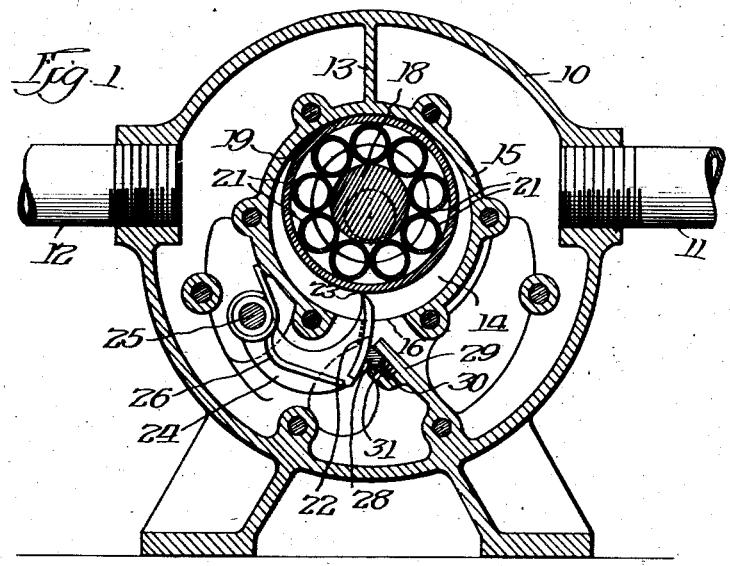
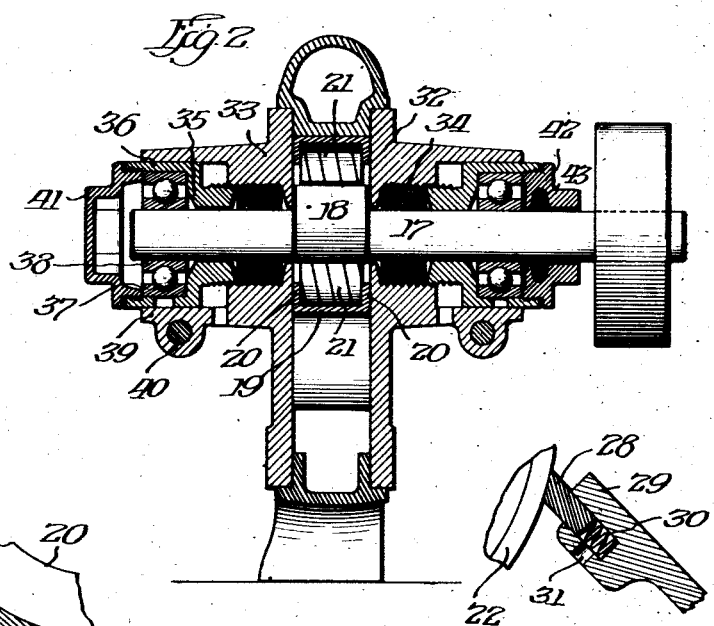

1,659,107

UNITED STATES PATENT OFFICE.

RASMUS M. HVID, OF CHICAGO, ILLINOIS.

ROTARY PUMP.

Application filed June 19, 1922. Serial No. 569,380.

My invention relates to rotary pumps and particularly to an improvement on the pump shown in my co-pending applications, Serial No. 505,042, filed Oct. 3, 1921, and Serial No. 530,846, filed Jan. 21, 1922.

One of the objects of my invention is to provide a resilient mounting for the rotary piston of the pump of my invention, using a material for that purpose which will be unaffected by different materials handled by the pump. Certain objections have been found to the use of the rubber roller disclosed in one of my above identified applications and this objection is overcome in the use of the construction here disclosed. The mounting of the rotary piston of the present invention provides in addition to the resilient function, the advantages of a roller bearing, this for the reason that I employ resilient, spirally wound, metallic cylinders which have all the advantages of solid roller bearings with the added advantage of resiliency as required.

A further advantage in the construction proposed is that of so shaping the gate or valve which divides the pump chamber into two parts as to balance the pressure tending to unseat the same. This avoids the necessity for a heavy spring and assures a tight engagement under all conditions of pressure. The result is secured in the construction shown by shaping the arcuate face of the valve on the outgoing pressure side so that arcs of different radii are formed, the inner portion of the valve being struck from an arc of shorter radius than the radius of oscillation of the valve. However, it should be understood that if the valve is formed by an arc the center of which is the center of oscillation of the valve, and the inner or piston-contacting end is thinned to a point, the force exerted on the opposite end, which is of larger area, by the outgoing pressure will tend to seat the valve.

A further object sought and advantage secured is in the construction of the sealing device which engages the outer arcuate face of the valve member. By providing an opening through the walls which hold the sealing device I admit the outgoing pressure to the back side of the sealing member and thus balance the pressure otherwise tending to unseat the same. This assures a tight fit and excludes the possibility of escape of pressure at that point.

A still further object is in the method of mounting the pump shaft. The glands are provided at a point close to the eccentric and a gland nut having the usual function and provided with a recessed head surrounds the shaft. Within the recess formed in the gland nut I mount a ball bearing cage of common form. By this means the glands may be tightened and leakage avoided, all without interfering in any manner with the ball bearings for the shaft.

The invention will be better understood by reference to the accompanying drawings, wherein, Fig. 1 is a vertical sectional view through a pump constructed in accordance with my invention;

Fig. 2 is a longitudinal sectional view;

Figure 3 is an enlarged sectional detail showing the form of the gate or valve employed, and;

Fig. 4 is a similar view showing the sealing device.

In the drawings it will be seen that I utilize a casing 10, having inlet and outlet pipe connections 11, 12. The interior of the casing is transversely divided by a wall 13. Provided within the casing is a pump chamber 14, formed by the circular wall 15, having a port 16 therein.

A shaft 17 is arranged concentric with the pump chamber 14, and has an eccentric 18 formed thereon within the compass of the pump chamber. A rotary piston 19 is mounted in the chamber, the piston being hollow and circular in outline and being provided with marginal inwardly projecting flanges 20. Confined between the flanges 20 of the rotary piston and surrounding the eccentric 18 are resilient roller bearings 21. These, as best shown in Fig. 2, are composed of a narrow strip of spring metal helically wound into a cylinder and are transversely resilient. The piston is installed with the rollers under a very slight compression; that is, the dimension between the high point of the eccentric and the inner surface of the rotary piston is a few thousandths of an inch less than the outer diameter of the roller bearings. Thus as the eccentric causes the revolution of the rotary piston the roller bearings are successively compressed very slightly. This results in the formation of a relatively tight engagement between the piston and the wall of the pump chamber.

A valve or gate 22 projects laterally through the port 16, with its inner end 23 in sliding engagement with the periphery of the piston. This valve is carried on an arm 24, pivoted at 25 and firmly held in operative position by means of the spring 26. The shape of the valve member is important. While the greater portion of the length of the part 22 is formed by an arc struck from a center concentric with the pivot 25, the outer portion 27 is formed by an arc of much shorter radius. This results in a construction which the pressure developed in the pump chamber is balanced so far as concerns its tendency to unseat the valve. I have found that in the construction shown the pressure is slightly over-balanced in favor of a tendency toward more firmly seating the valve. Thus the spring 26 has a function only of retaining the valve in position when starting the pump into operation. The reference to the curvature of the valve member applies only to the inner face thereof, inasmuch as this is the portion which is acted upon by the developed pressure.

As heretofore explained, the desired result is, in effect, secured by thinning the piston-contacting end of the valve so that in all positions thereof there is no end exposed to the developed pressure. Therefore, while I have shown the end curved on a shorter radius it is not entirely necessary in order to secure the desired balancing of pressure.

The outer surface of the valve member is also arcuate, the arc being struck from a center coincident with the center of the pivot 25 and this enables the employment of a sealing member 28, slidably mounted in a space provided in the web or wall 29, and normally advanced by a compression spring 30. However, I provide in addition to the spring a small port 31 in the wall 29, by means of which the pressure developed by the pump is admitted to the rear of the sealing member 28. Thus the pressure tending to unseat the sealing device is balanced and the spring functions only at the time of starting. A port having the same function may be provided by recessing or grooving the lower face of the sealing member. The pressure will thus be admitted to the back side in the same manner as in the construction shown.

The sides of the casing 10 are closed by means of heads 32, 33, of duplicate construction which are suitably secured in position by means of bolts. The heads are recessed to accommodate the shaft 17, and packing material 34 is placed in the inner ends of the recesses. Gland nuts 35 have threaded engagement with the inner surfaces of the recesses and operate in the usual manner to make a fluid-tight joint. However, the gland nuts are of special construction and include recessed heads 36, within which a cage 37 for the roller bearing 38 is mounted. The cage is tightly fitted within the recessed head of the gland nut and movement of the nut as required in adjusting the packing results merely in the sliding of the roller bearing longitudinally of the shaft. The boss 39 surrounding the recess in the head can be split and a clamping bolt 40 is utilized to firmly secure the gland nut in adjusted position. In the construction shown at the left of Fig. 2, the open end of the gland nut is closed by a cap 41. On the opposite end a similar cap 42 is employed which is apertured to accommodate the projecting end of the shaft 17. Packing 43 may be placed in the cap 42 to prevent the escape of lubricating grease.

When it is desired to tighten the gland nut, a wrench is applied to the projecting flanges 36 and the gland nut is rotated after the clamping bolt 40 is loosened.

The provision of the resilient roller bearings enables the use of the pump for all sorts and conditions of material. The piston has a true rolling action and in the event that solid material is contained within the fluid being handled, the piston will, due to the resiliency of the rollers, recede sufficiently to enable it to pass over the obstruction. Furthermore, the piston and bearings will be unaffected by the materials handled.

An important advantage in the use of a construction such as here illustrated is that of providing a self-contained pressure regulator; that is to say the resilient bearings enable the rotary piston to recede from the peripheral walls of the pump chamber and permit the escape of pressure. This is important particularly where liquids are being pumped as it avoids the necessity for a safety valve or similar means to prevent breakage of the pump or connections.

Obviously the construction is capable of much modification and I do not wish to be limited except as indicated in the appended claims.

I claim:

1. In a rotary pump, the combination of walls providing a circular chamber, an eccentric rotatable therein, a rotary piston having rolling contact with the chamber walls, a gate engaging one side of the piston, and compressible roller bearings interposed between the eccentric and the rotary piston.

2. In a rotary pump, the combination of walls providing a circular chamber, an eccentric rotatable therein, a rotary piston having rolling contact with the chamber walls, a gate engaging one side of the piston, and resilient roller bearings surrounding the eccentric and supporting the rotary piston.

3. In a rotary pump, the combination of a casing providing a circular chamber, a crank revoluble within said chamber, a rotary piston having rolling contact with the chamber walls of less diameter than said chamber and adapted to roll therein, a gate engaging the piston and dividing the chamber into two compartments, and resilient roller bearings between the crank and the piston.

4. In a rotary pump, the combination of a casing providing a pump chamber, a rotary piston having rolling contact with the chamber walls therein, an eccentric for moving said piston, and spirally wound, resilient, metallic roller bearings interposed between the eccentric and the piston.

5. In a rotary pump, the combination of a casing providing a pump chamber, a rotary piston having rolling contact with said chamber walls in said chamber, an eccentric for revolving said piston, and a gate projecting through a wall in said chamber and bearing against the periphery of said piston, said gate being shaped to balance the pressure tending to separate the same from its engagement with said piston.

Signed at Chicago, Illinois, this 15th day of June, 1922.

RASMUS M. HVID.